United States Patent
Gill

(10) Patent No.: US 7,639,883 B2
(45) Date of Patent: Dec. 29, 2009

(54) METHOD, DEVICE, MOBILE TERMINAL AND COMPUTER PROGRAM PRODUCT FOR PROVIDING VARIABLE COMPRESSION OF DATA FILES

(75) Inventor: Christopher P. Gill, Hants (GB)

(73) Assignee: Nokia Corporation, Espoo (FI)

( * ) Notice: Subject to any disclaimer, the term of this patent is extended or adjusted under 35 U.S.C. 154(b) by 739 days.

(21) Appl. No.: 11/406,449

(22) Filed: Apr. 18, 2006

(65) Prior Publication Data
US 2007/0242893 A1 Oct. 18, 2007

(51) Int. Cl.
*G06K 9/36* (2006.01)
(52) U.S. Cl. ...................................... 382/232
(58) Field of Classification Search ......... 382/232–233, 382/236, 238–240, 244–251; 348/384.1, 348/390.1, 403.1–413.1, 420.1–421.1; 375/240, 375/240.01–240.24
See application file for complete search history.

(56) References Cited

U.S. PATENT DOCUMENTS

| | | | | |
|---|---|---|---|---|
| 4,447,886 A | * | 5/1984 | Meeker | 708/400 |
| 5,122,873 A | * | 6/1992 | Golin | 375/240.23 |
| 5,170,264 A | * | 12/1992 | Saito et al. | 382/239 |
| 5,333,212 A | * | 7/1994 | Ligtenberg | 382/250 |
| 5,659,636 A | * | 8/1997 | Maeda et al. | 382/248 |

* cited by examiner

Primary Examiner—Jose L Couso
(74) Attorney, Agent, or Firm—Alston & Bird LLP

(57) ABSTRACT

A device for providing variable compression of data files includes a weighting module, a summing module, and a processing element. The weighting module is capable of assigning a weighting value to each coefficient of an array of j number of coefficients. Each weighting value defines a characteristic associated with each corresponding coefficient. The summing module is in communication with the weighting module and is capable of adding the magnitude of a weighted value of an $i^{th}$ coefficient to the absolute sum of weighted values of all previous coefficients, i being a value from 1 to j. The processing element is in communication with the summing module and is capable of comparing the absolute sum of the weighted values of the $i^{th}$ coefficient and the previous coefficients to a threshold. If the absolute sum of the weighted values of the $i^{th}$ coefficient and the previous coefficients is greater than the threshold then each of the previous coefficients are replaced with a zero. If the absolute sum of the weighted values of the $i^{th}$ coefficient and the previous coefficients is less than or equal to the threshold, then i is incremented by one for repeated summing at the summing module.

34 Claims, 5 Drawing Sheets

METHOD, DEVICE, MOBILE TERMINAL AND COMPUTER PROGRAM PRODUCT FOR PROVIDING VARIABLE COMPRESSION OF DATA FILES

FIELD OF THE INVENTION

Embodiments of the present invention relate generally to data compression technology and, more particularly, relate to a method, device, mobile terminal and computer program product for providing variable compression of data files, and particularly image data files.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to image processing services for images captured by a mobile terminal. The image processing services may be provided from a network server or other network device, from the mobile terminal such as, for example, a mobile telephone, a mobile television, a mobile gaming system, etc, or even from a combination of the mobile terminal and the network device. The image processing services may include transmission, storage, processing, etc., of image files. For example, images captured by the mobile terminal may be stored in a memory of the mobile terminal, or communicated from the mobile terminal to a network device, such as a photo printer in communication with a wireless network.

In current applications, a user of a mobile terminal who wishes to wirelessly communicate images captured by the mobile terminal may experience relatively long delays in transmitting the images to the network device or to other mobile terminals. The long delays result due to the relatively long transmission times required to transmit image files of the size typically captured by imaging devices on modern mobile terminals. This is true even for image files that have been compressed, for example, by JPEG compression, which is well known in the art and commonly employed in current mobile terminals. Additionally, even assuming the user does not transmit the image file wirelessly, but instead, chooses to store the image file in a memory device of the mobile terminal, the size of the image file may present problems with regard to consumption of available memory.

Image processing, and especially image compression, at mobile terminals faces additional unique challenges. Due to the nature of mobile terminals, it is advantageous to limit the size and weight of such devices. Accordingly, there are often stringent limitations on the amounts and types of hardware included in such devices. Thus, memory may be limited or eliminated wherever possible. An effect of this desire to limit extraneous memory may be realized in the area of image processing by creating desirable limits for final compressed image data file size. In order to ensure image data files meet the final compressed image limits, it is often desirable to quantize image data and reduce certain "less important" quantized values to zero in order to get a smaller final compressed image data file size.

The quantization step is often performed by using a Q-table. For example, an image, or segment of an image, may be divided into a tiled array of 8×8 blocks as shown in FIG. 5. Each of the blocks may represent a pixel. Thus, the tiled array includes 64 pixels in which each pixel represents, for example, a greyscale value in the spatial domain. Each greyscale value may be, for example, a value between 0 and 255 for an 8 bit pixel. The tiled array is then transformed, for example, using a Discrete Cosine Transform (DCT), to produce a DCT coefficient array in the frequency domain. The Q-table is then applied to the DCT coefficient array to produce an array of quantized coefficients. Generally, more heavily quantized coefficients corresponding to high frequency image data carry less useful or important information for reconstructing an image. Thus, the Q-table is often defined such that values expected to contain "less important" information are likely to be reduced to zero as a result of the quantization, thereby increasing the number of zero values in the array of quantized coefficients.

The array of quantized coefficients is converted to a linear sequence by means of a "zigzag order" as shown by the arrows in FIG. 5. The linear sequence is then compressed using, for example, run length encoding (RLE) and standard entropy compression such as Huffman compression. If the quantization step has produced many zeros, the resulting compressed image data file is likely to have a relatively small size as may be desired. However, in a situation where image data must be compressed in a single pass, such as in an image co-processor with no frame store, there is no guarantee that the compressed image data file will have a size that meets a desired size. Accordingly, a specified number of bits may be reduced to zero in each image to further decrease resultant compressed image file sizes. Since standard compression, such as the JPEG standard, does not permit use of multiple different Q-tables for the same data set of one channel image, methods of reducing more bits to zero often treat each 8×8 block or part of the image the same and therefore throw away important data for some images by over compressing an 8×8 block or part of the image with a relatively high amount of useful information, while under compressing an 8×8 block or part of the image with a relatively low amount of useful information.

Given the above described problems, it may be advantageous to compress images, or otherwise reduce image file size beyond the standard compression methods currently employed. However, attempts to further reduce image file size often lead to a loss in image data and a subsequent reduction in image quality. Thus, there is a need for a means to reduce image file size while minimizing any degradation that is visually perceptible to a viewer of the image.

BRIEF SUMMARY OF THE INVENTION

A method, apparatus, mobile terminal and computer program product are therefore provided that variably compress image files with visually acceptable degradation in image quality. By variably compressing image files, image files with relatively high amounts of useful information can be compressed less, while image files having a relatively low amount of useful information can be compressed more to achieve an average image file size within a desirable limit. Thus, storage space and transmission times for high resolution image files may be reduced without seriously compromising image quality. Accordingly, efficiency may be increased for storage and transmission operations related to image files. The method, apparatus, mobile terminal and computer program product provided are also capable of variably compressing other data files such as MPEG files or any other data that is not saved, but rather processed as a data stream.

In one exemplary embodiment, methods and computer program products for providing variable compression of data files are provided. The methods and computer program products include first, second, third, fourth and fifth operations or executable portions. The first operation or executable portion is for assigning a weighting value to each coefficient of an array of j number of quantized coefficients in which each weighting value defines a characteristic associated with each corresponding coefficient. The second operation or executable portion is for adding a magnitude of a weighted value of an $i^{th}$ coefficient to an absolute sum of weighted values of all previous coefficients, i being a value from 1 to j. The third operation or executable portion is for comparing an absolute sum of the weighted values of the $i^{th}$ coefficient and the previous coefficients to a threshold. The fourth operation or executable portion is for replacing each of the previous coefficients with a zero if the absolute sum of the weighted values of the $i^{th}$ coefficient and all previous coefficients is greater than the threshold. The fifth operation or executable portion is for incrementing i by one and repeating the adding step if the absolute sum of the weighting values of the $i^{th}$ coefficient and all previous coefficients is less than or equal to the threshold.

In another exemplary embodiment, a device for providing variable compression of data files is provided. The device includes a weighting module, a summing module, and a processing element. The weighting module is capable of assigning a weighting value to each coefficient of an array of j number of quantized coefficients. Each weighting value defines a characteristic associated with each corresponding coefficient. The summing module is in communication with the weighting module and is capable of adding a magnitude of a weighted value of an $i^{th}$ coefficient to an absolute sum of weighted values of all previous coefficients, i being a value from 1 to j. The processing element is in communication with the summing module and is capable of comparing an absolute sum of the weighted values of the $i^{th}$ coefficient and the previous coefficients to a threshold. If the absolute sum of the weighted values of the $i^{th}$ coefficient and the previous coefficients is greater than the threshold then each of the previous coefficients are replaced with a zero. If the absolute sum of the weighting values of the $i^{th}$ coefficient and the previous coefficients is less than or equal to the threshold, then i is incremented by one for repeated summing at the summing module.

In another exemplary embodiment, a mobile terminal for providing variable compression of data files is provided. The mobile terminal includes a weighting module, a summing module, and a processing element. The weighting module is capable of assigning a weighting value to each coefficient of an array of j number of quantized coefficients. Each weighting value defines a characteristic associated with each corresponding coefficient. The summing module is in communication with the weighting module and is capable of adding a magnitude of a weighted value of an $i^{th}$ coefficient to an absolute sum of weighted values of all previous coefficients, i being a value from 1 to j. The processing element is in communication with the summing module and is capable of comparing an absolute sum of the weighted values of the $i^{th}$ coefficient and the previous coefficients to a threshold. If the absolute sum of the weighted values of the $i^{th}$ coefficient and the previous coefficients is greater than the threshold then each of the previous coefficients are replaced with a zero. If the absolute sum of the weighted values of the $i^{th}$ coefficient and the previous coefficients is less than or equal to the threshold, then i is incremented by one for repeated summing at the summing module.

In another exemplary embodiment, a method for providing variable compression of data files are provided. The method includes receiving a data segment comprising a plurality of blocks having respective coefficients associated with each of the blocks, assigning a weighting value to each of the coefficients based on frequency information associated with data in each of the blocks, and setting one or more of the coefficients to zero based on an aggregation of weighted values. Different numbers of coefficients are set to zero in one data segment than in another data segment. Additionally, the setting step includes comparing the aggregation of the weighted values to a threshold and setting the one or more coefficients to zero in response to the aggregation reaching the threshold.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
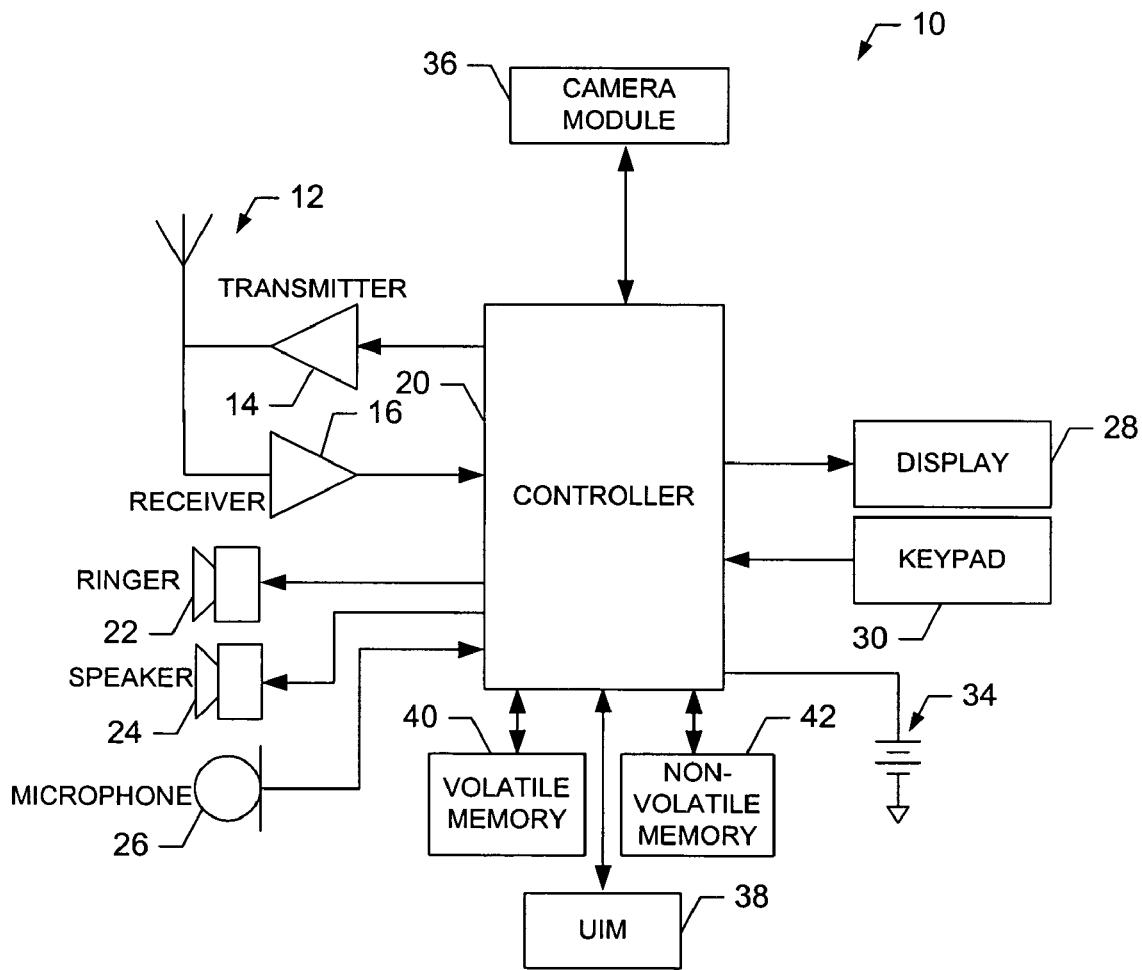
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from the present invention. It should be understood, however, that a mobile telephone as illustrated and hereinafter described is merely illustrative of one type of mobile terminal that would benefit from the present invention and, therefore, should not be taken to limit the scope of the present invention. While several embodiments of the mobile terminal 10 are illustrated and will be hereinafter described for purposes of example, other types of mobile terminals, such as portable digital assistants (PDAs), pagers, mobile televisions, laptop computers and other types of voice and text communications systems, can readily employ the present invention. Furthermore, devices that are not mobile may also readily employ embodiments of the present invention.

In addition, while several embodiments of the method of the present invention are performed or used by a mobile terminal 10, the method may be employed by other than a mobile terminal. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA) or third-generation wireless communication protocol Wideband Code Division Multiple Access (WCDMA).

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad. The mobile terminal 10 further includes a battery 34, such as a vibrating battery pack, for powering various circuits that are required to operate the mobile terminal 10, as well as optionally providing mechanical vibration as a detectable output.

In an exemplary embodiment, the mobile terminal 10 includes a camera module 36 in communication with the controller 20. The camera module 36 may be any means for capturing an image for storage, display or transmission. For example, the camera module 36 may include a digital camera capable of forming a digital image file from a captured image. As such, the camera module 36 includes all hardware, such as a lens or other optical device, and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to a JPEG standard format.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
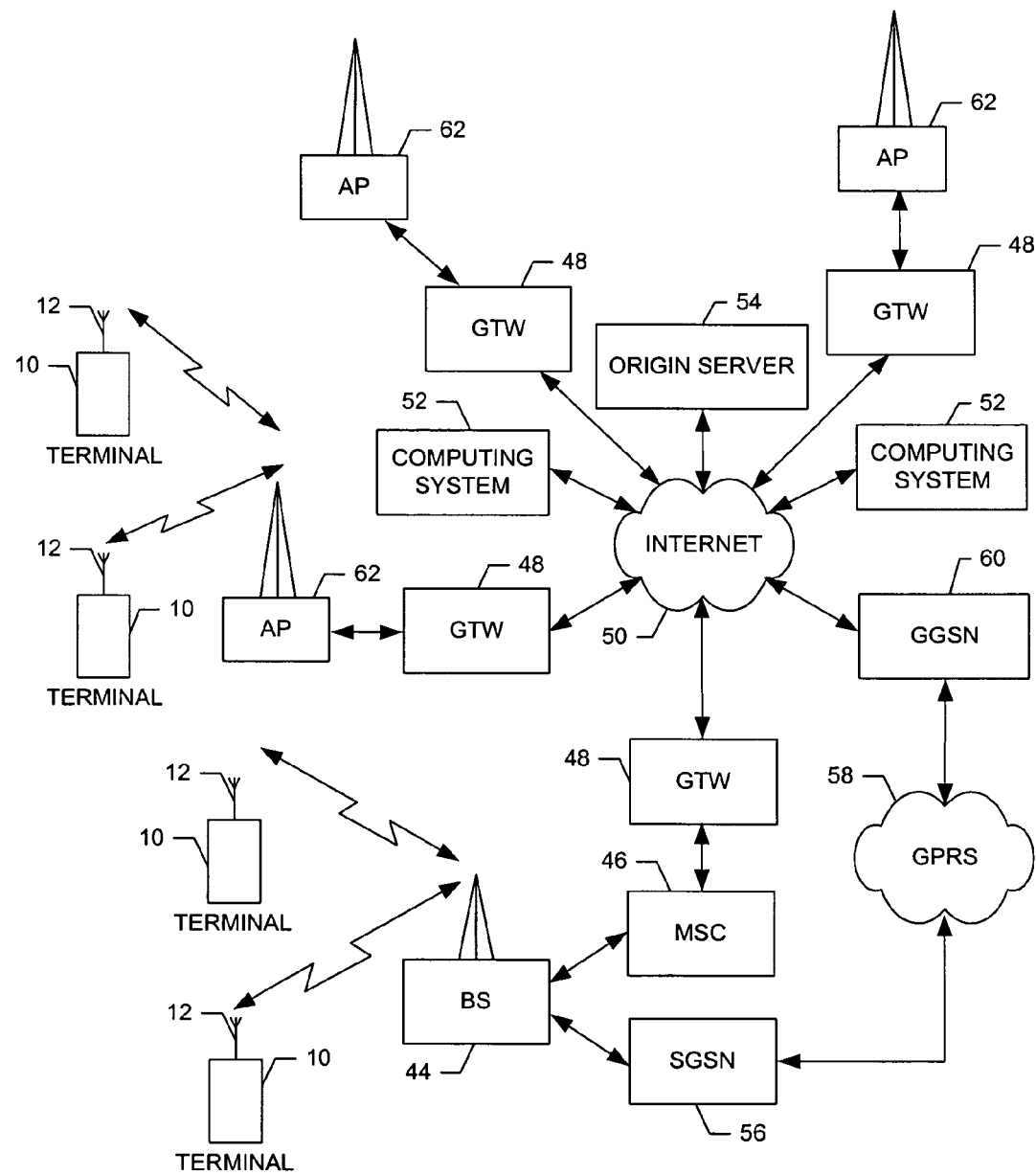
FIG. 2 is a schematic block diagram of a wireless communications system according to an exemplary embodiment of the present invention.

Referring now to FIG. 2, an illustration of one type of system that would benefit from the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and the present invention is not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G, third-generation (3G) and/or future mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

An exemplary embodiment of the invention will now be described with reference to FIG. 3, in which certain elements of a system for in-image variable compression are displayed. The system of FIG. 3 may be employed, for example, on the mobile terminal 10 of FIG. 1. However, it should be noted that the system of FIG. 3, may also be employed on a variety of other devices, both mobile and fixed, and therefore, the present invention should not be limited to application on devices such as the mobile terminal 10 of FIG. 1. It should also be noted, however, that while FIG. 3 illustrates one example of a configuration of a system for in-image variable compression, numerous other configurations may also be used to implement the present invention.

Figure 3:
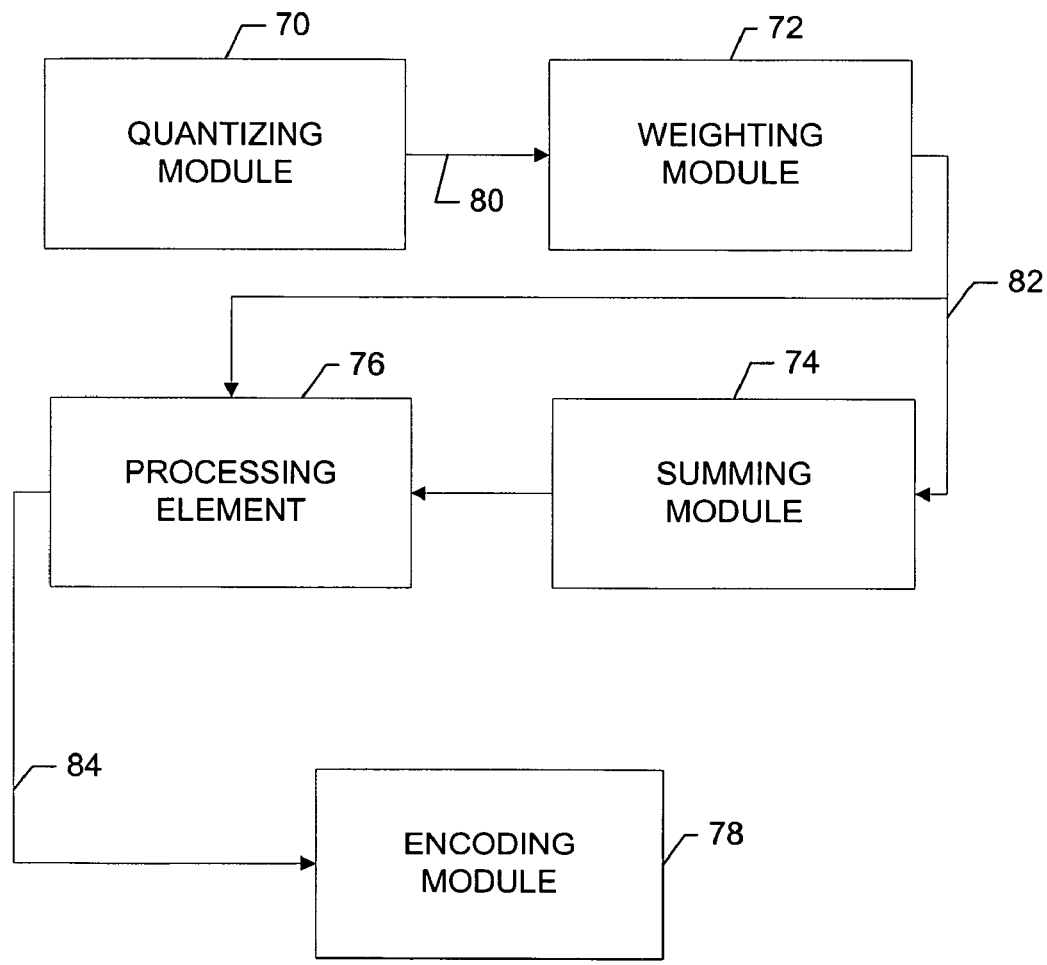
FIG. 3 illustrates a block diagram showing an encoding module and a decoding module according to an exemplary embodiment of the present invention.
Figure 5:
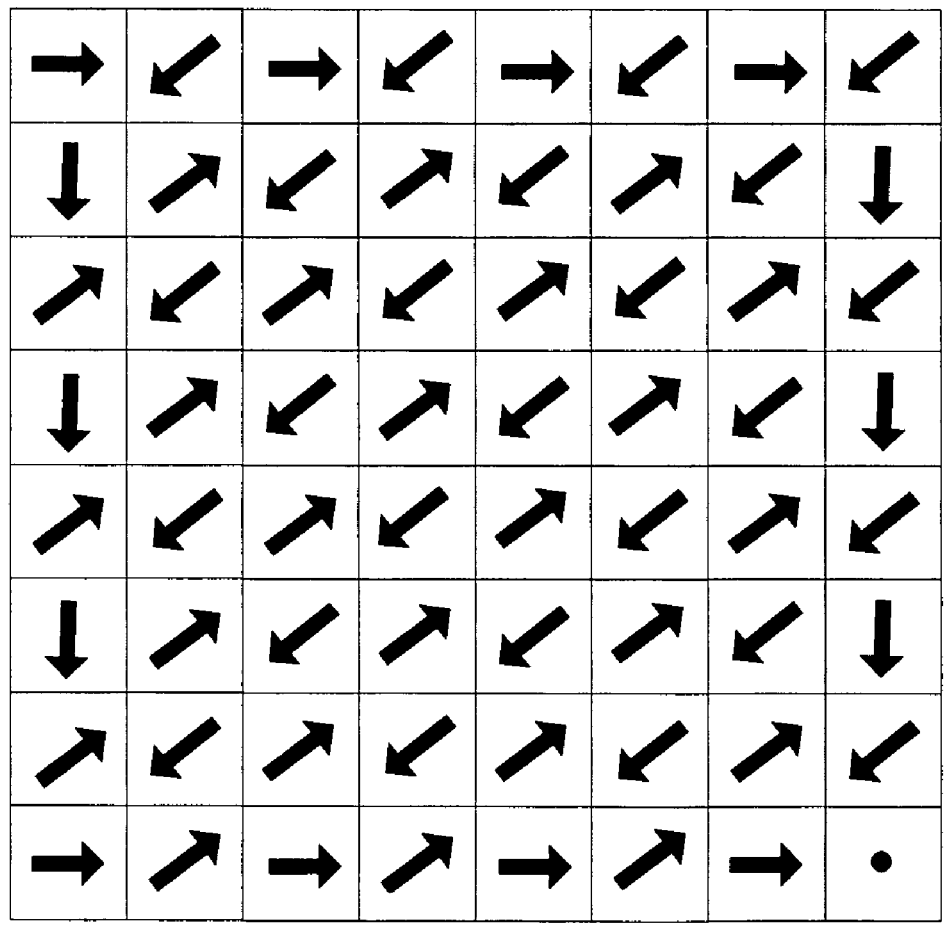
FIG. 5 is an illustration of an 8×8 quantized data array illustrating a sequence of linearization prior to encoding and compression according to a conventional method.

Referring now to FIG. 3, a system for in-image variable compression is provided. The system includes a quantizing module 70, a weighting module 72, a summing module 74, a processing element 76, and an encoding module 78. The quantizing module 70 may be any means or device embodied in hardware, software or a combination of hardware and software that is capable of producing an array of quantized DCT coefficients 80 as described above. In an exemplary embodiment, the quantizing module 70 may include any known element capable of applying a Q-table to a DCT coefficient array. The quantizing module 70 may further include elements for dividing an image into a tiled array and transforming the tiled array into the DCT coefficient array by performing a DCT transform on the tiled array, however, such capability is not necessary and may reside in another element not shown in FIG. 3. The quantizing module 70 may produce the array of quantized DCT coefficients in a similar manner to that described above with reference to FIG. 5. Alternatively, the array of quantized DCT coefficients 80 may be produced in some other way.

The weighting module 72 may be any device or means embodied in either hardware, software, or a combination of hardware and software that is capable of weighting each of the quantized DCT coefficients as described below. In an exemplary embodiment, the weighting module 72 is embodied in hardware that forms a portion of the camera module 36. Alternatively, the weighting module 72 may be embodied, for example, in software as instructions that are stored on a memory of the mobile terminal 10, or firmware that forms a portion of the camera module 36. The weighting module 72 modifies each of the DCT coefficients using a weighting value to produce an array of weighted quantized DCT coefficients 82. In an exemplary embodiment, the modification is accomplished by multiplication of each quantized DCT coefficient by a corresponding weighting value. In other words, the array of quantized DCT coefficients 80 is multiplied by an array of weighting values to produce the array of weighted quantized DCT coefficients 82.

Each weighting value may be selected to define a characteristic associated with each corresponding quantized DCT coefficient. As described above, high frequency data generally represents data that is less useful in reconstructing an image because the high frequency data typically corresponds to fine details with in the image, which the human visual system is less able to perceive. Accordingly, the high frequency data may often be eliminated with out substantially reducing image quality upon reconstruction. However, very high frequency data may correspond to data that would otherwise be perceived by the human visual system and therefore, if eliminated, will noticeably reduce image quality upon reconstruction. Thus, in an exemplary embodiment, the weighting values may be selected to differentiate between DCT coefficients corresponding to low frequency image data and DCT coefficients corresponding to high frequency image data. The weighting values may also be selected to differentiate between DCT coefficients corresponding to high frequency image data and DCT coefficients corresponding to very high frequency image data. For example, the weighting values may be selected to assign no weighting value, or a relatively low weighting value to low frequency or very high frequency data, while assigning a higher weighting value to typical high frequency data. After weighting values have been assigned to the quantized DCT coefficients at the weighting module 72, the array of weighted quantized DCT coefficients 82 are sent to the summing module 74.

The summing module 74 and the processing element 76 may each be any device or means embodied in either hardware, software, or a combination of hardware and software that is capable of summing the magnitude of the weighted values of each of the quantized DCT coefficients and comparing a result to a threshold as described below. In an exemplary embodiment, the summing module 74 and the processing element 76 may be embodied in hardware that forms a portion of the camera module 36. Alternatively, the summing module 74 and the processing element 76 may be embodied in software as instructions that are stored on a memory of the mobile terminal 10, or firmware that forms a portion of the camera module 36. As yet another alternative, the summing module 74 and the processing element 76 may be combined in a single entity. In fact, the weighting module 72, the summing module 74 and the processing element 76 may all be combined in a single element such as, for example, a hardware accelerator. Furthermore, any of the weighting module 72, the summing module 74 and the processing element 76 may be embodied in another element of the mobile terminal 10 other than the camera module 36.

The summing module 74 sequentially sums the magnitude of the weighted values associated with each of the quantized DCT coefficients in a particular sequence and the processing element 76 compares an absolute sum of the the weighted values to a threshold. When the absolute sum of the weighted values reaches the threshold, all quantized DCT coefficients corresponding to previously summed weighted values are set to zero. In other words, if the threshold is exceeded by adding the weighted value corresponding to the $n^{th}$ quantized DCT coefficient, then each of the first n−1 corresponding quantized DCT coefficients are replaced by zeros. Thus, the processing element 76 of one embodiment of the present invention outputs a resultant quantized DCT array 84 that may be converted to a resultant linear sequence in the processing element 76 or elsewhere to be sent to the encoding module 78. Alternatively, the processing element 76 may convert the resultant quantized DCT array 84 into the resultant linear sequence for communication to the encoding module 78. As yet another alternative embodiment according to FIG. 3, the encoding module 78 may receive the resultant quantized DCT array 84 for conversion to the resultant linear sequence and subsequent encoding and compression as described above. The encoding module 78 may be any device or means embodied in either hardware, software, or a combination of hardware and software that is capable of encoding and compressing image data. The encoding module 78 may be any encoding device known in the art such as, for example, a JPEG encoder.

Accordingly, since each tiled array comprising an 8×8 block may represent different image data, embodiments of the present invention do not reduce a fixed amount of quantized values to zero for each tiled array. Rather, variable reduction of quantized values is applied to each tiled array. Thus, the threshold will be reached quickly in an 8×8 block having relatively high amounts of information (or at least high amounts of high frequency or detailed information) and the threshold will be reached slowly in an 8×8 block having relatively low amounts of information (or at least low amounts of high frequency or detailed information). Accordingly, 8×8 blocks or image segments that have a relatively large amount of information may have less information removed, while 8×8 blocks or image segments having a relatively low amount of information may have more information removed. On average, the 8×8 blocks or image segments may still produce compressed image file sizes below a desirable size.

It should be noted, however, that the threshold, the sequence of summing the magnitudes of the weighted values of the quantized DCT coefficients, and the weighting values may each be varied at any point during data processing. In other words, in an exemplary embodiment, the threshold, the sequence of summing the weighted values of the quantized DCT coefficients, and the weighting values may each be considered dynamic variables. For example, the weighting values may be altered to further emphasize differences between quantized DCT coefficients corresponding to high, low and very high frequency image data. In another exemplary embodiment, the magnitudes of the weighted values may be summed in a sequence that progresses in a direction opposite to that shown in FIG. 5. In other words, the magnitudes of the weighted values may be summed in a "zigzag order" progressing from what would be a bottom right corner of the array of weighted quantized DCT coefficients 82 to a top left corner of the array. Accordingly, the resultant quantized DCT array 84 may contain a plurality of zero values in the bottom right corner of the array. Thus, in terms of the resultant linear sequence that is then sent to the encoding module 78, data at an end of the resultant linear sequence may include a plurality of quantized DCT coefficients replaced by zero values. Since data at the bottom right corner of resultant quantized DCT array 84 typically correlates to high frequency image data, replacement of the corresponding quantized DCT coefficients with zero values limits degradation to the quality of the 8×8 block or image segment associated with a particular tiled array of image data when the 8×8 block is reconstructed. Furthermore, replacement of additional quantized DCT coefficients with zero values provides for smaller compressed image file sizes.

In an exemplary embodiment, the dynamic variables may be initially selected based on estimated and/or historical values for each of the threshold, the sequence of summing the magnitudes of weighted values of the quantized DCT coefficients, and the weighting values which are likely to reduce the resultant linear sequence produced from the resultant quantized DCT array 84 to a specified number k of non-zero values based on a statistical mean. The number k may be chosen to make it likely that each 8×8 block of image data yet to be processed for a particular image file will compress into a number of bytes still available to reach a desirable final compressed data file size. For example, if the desirable final compressed data file size is 50 kilobytes, which could be considered a budget, the processing element 76 may select a threshold that is expected to result in k number of non-zero values in order to produce a compressed image file size with in the budget based on a statistical mean.

A decision to alter the dynamic variables above may be made by the processing element 76 during the course of compression in consideration of a projected compressed file size. Thus, for example, the processing element 76 may receive information related to an amount of the budget remaining as well as an indication as to an amount of the image data yet to be processed. Based on a relationship between the amount of the budget remaining and the amount of the image data yet to be processed, the processing element 76 may either increase or decrease the threshold in order to maximize a quality of the final compressed image file, while ensuring that the final compressed image file is with in the budget. A similar procedure may be employed to modify the sequence of summing the magnitudes of the weighted values of the quantized DCT coefficients, and the weighting values. Additionally, in exemplary embodiments, the processing element 76 may receive information as to the amount of the budget remaining and the amount of the image data yet to be processed either continuously, at regular intervals, or at predetermined time periods during image processing. Furthermore, a decision to alter the dynamic variables may be made at another element other than the processing element 76. For example, the controller 20 or yet another component of the mobile terminal 10 may make the decision.

In an exemplary embodiment, an amount by which the dynamic variables are changed may be a fixed value. For example, one of the dynamic variables may be altered by a predetermined percentage whenever a decision to change one of the dynamic variables is made. Alternatively, the amount by which the dynamic variables are changed may be selected by the processing element 76 based on the relationship between the amount of the budget remaining and the amount of the image data yet to be processed.

It should be noted that although the preceding is described in terms of summing the magnitudes of weighted values until the threshold is reached, embodiments of the present invention also contemplate a situation in which weighted values are subtracted from a threshold until a zero value or some other threshold value is reached. Additionally, it will be understood that although the preceding is described in terms of sequentially adding a magnitude of a current weighted value to an absolute sum of previous weighted values, this should not be construed as necessarily involving a storing of the absolute sum of previous weighted values and subsequently adding the magnitude of the current weighted value. Rather, a plurality of the magnitudes of previous weighted values may be added to the magnitude of the current weighted value to produce a single sum during each iteration of embodiments of the present invention.

Figure 4:
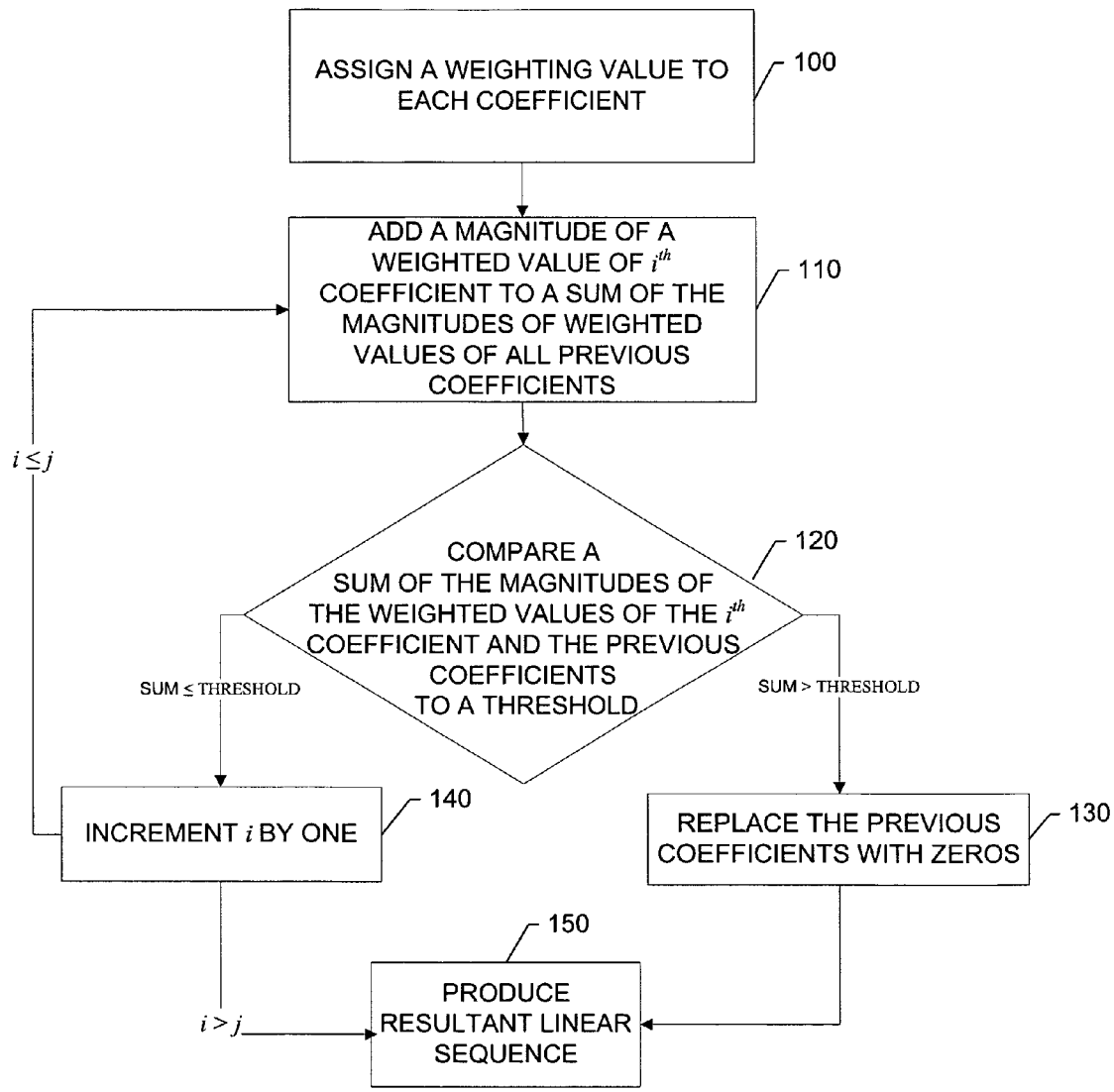
FIG. 4 is a flowchart according to an exemplary method of compressing image files according to an exemplary embodiment of the present invention.

FIG. 4 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing in-image variable compression of image files includes assigning a weighting value to each coefficient of an array of j number of quantized coefficients at operation 100. Each weighting value defines a characteristic associated with each corresponding coefficient. For example, each weighting value may be an indication of frequency information associated with the corresponding coefficient. At operation 110, a magnitude of a weighted value of an $i^{th}$ coefficient is added with an absolute sum of weighted values of all previous coefficients, in which i is a value sequentially incremented from 1 to j. An absolute sum of the weighted values of the $i^{th}$ coefficient and the previous coefficients is compared to a threshold at operation 120. At operation 130, if the absolute sum of the weighted values of the $i^{th}$ coefficient and the previous coefficients is greater than the threshold, then the previous coefficients are each replaced with a zero to form a resultant sequence at operation 150. If the absolute sum of the weighted values of the $i^{th}$ coefficient and the previous coefficients is less than or equal to the threshold, then i is incremented by one at operation 140 and if i≦j operation 110 is repeated. If i>j, then a resultant linear sequence is produced at operation 150. The resultant linear sequence formed at operation 150 is either a modified sequence including zeros for the previous coefficients and unchanged values for remaining coefficients in response to the sum of the weighted values of the $i^{th}$ coefficient and the previous coefficients being greater than the threshold, or a sequence formed from unchanged values from the array of j number of quantized coefficients if the absolute sum of the weighted values of the $j^{th}$ coefficient and all previous coefficients is less than or equal to the threshold.

It should be noted that although an exemplary embodiment replaces all the previous coefficients with zero values, an alternative exemplary embodiment could replace the $i^{th}$ coefficient and the previous coefficients with zeros. Furthermore, although an exemplary embodiment replaces the previous coefficients with zero values when the sum of the weighting values of the $i^{th}$ coefficient and the previous coefficients is greater than the threshold, an alternative exemplary embodiment could replace either the previous coefficients or the $i^{th}$ coefficient and the previous coefficients with zeros in response to the sum of the weighting values of the $i^{th}$ coefficient and the previous coefficients being greater than or equal to the threshold.

Additionally, although the preceding exemplary embodiment has been described in the context of processing related to image files, it should be noted that embodiments of the present invention may advantageously be employed in other contexts as well. For example, an embodiment of the present invention may be applied to variable compression of MPEG video data, audio data or other sampled data. Furthermore, embodiments of the present invention may be advantageously employed for variable compression of any data files that are not saved in a memory during processing, but rather are processed in a stream or a buffer.

The above described functions may be carried out in many ways. For example, any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium. It should also be noted, that although the above described principles have been applied in the context of image files, similar principles would also apply to the delivery of certain other data files. Examples of such data files include, but are not limited to, video and graphics files. Furthermore, although the above described embodiments may be particularly useful in the context of processing streaming data where only a single pass of the data through an image processing device, embodiments of the present invention may also be useful in other contexts and should not be limited merely to processing of streaming data.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included with in the scope of the appended claims. Although specific terms are employed herein, they are used in a generic and descriptive sense only and not for purposes of limitation.

What is claimed is:

1. A method comprising:
utilizing a processor for assigning a weighting value to each coefficient of an array of j number of quantized coefficients, each weighting value defining a characteristic associated with each corresponding coefficient;
adding a magnitude of a weighted value of an $i^{th}$ coefficient to a magnitude of each weighted value of all previous coefficients, i being a value from 1 to j;
comparing an absolute sum of the weighted values of the $i^{th}$ coefficient and the previous coefficients to a threshold;
replacing each of the previous coefficients with a zero if the absolute sum of the weighted values of the $i^{th}$ coefficient and all previous coefficients is greater than the threshold; and
incrementing i by one and repeating the adding operation if the absolute sum of the weighted values of the $i^{th}$ coefficient and all previous coefficients is less than or equal to the threshold.

2. A method according to claim 1, further comprising receiving an indication of an amount of data yet to be processed.

3. A method according to claim 2, further comprising receiving an indication of a remaining amount of budget in order to achieve a target data file size.

4. A method according to claim 3, further comprising changing the threshold dynamically in order to compress a data file to the target data file size in response to the indication of the amount of data yet to be processed and the remaining amount of budget.

5. A method according to claim 3, further comprising changing the weighting values dynamically in order to compress a data file to the target data file size in response to the indication of the amount of data yet to be processed and the remaining amount of budget.

6. A method according to claim 1, wherein the adding operation is performed in accordance with a predetermined sequence.

7. A method according to claim 1, further comprising forming a resultant linear sequence of coefficients from one of:
a modified sequence including zeros for the previous coefficients and unchanged values for remaining coefficients in response to the absolute sum of the weighted values of the $i^{th}$ coefficient and the previous coefficients being greater than the threshold; and a sequence formed from unchanged values from the array of j number of quantized coefficients if the absolute sum of the weighted values of the $j^{th}$ coefficient and the previous coefficients is less than or equal to the threshold.

8. A method according to claim 7, further comprising encoding the resultant linear sequence of coefficients using a JPEG encoder.

9. A method according to claim 1, the adding operation is performed in accordance with a sequence that is dynamically alterable.

10. A computer program product comprising at least one computer-readable storage medium having computer-readable program code portions stored therein, the computer-readable program code portions comprising:
   a first executable portion for assigning a weighting value to each coefficient of an array of j number of quantized coefficients, each weighting value defining a characteristic associated with each corresponding coefficient;
   a second executable portion for adding a magnitude of a weighted value of an $i^{th}$ coefficient to a magnitude of each weighted value of all previous coefficients, i being a value from 1 to j;
   a third executable portion for comparing an absolute sum of the weighted values of the $i^{th}$ coefficient and the previous coefficients to a threshold;
   a fourth executable portion for replacing each of the previous coefficients with a zero if the absolute sum of the weighted values of the $i^{th}$ coefficient and all previous coefficients is greater than the threshold; and
   a fifth executable portion for incrementing i by one and repeating the adding operation if the absolute sum of the weighted values of the $i^{th}$ coefficient and all previous coefficients is less than or equal to the threshold.

11. A computer program product according to claim 10, further comprising a sixth executable portion for receiving an indication of an amount of data yet to be processed.

12. A computer program product according to claim 11, further comprising a seventh executable portion for receiving an indication of a remaining amount of budget in order to achieve a target data file size.

13. A computer program product according to claim 12, further comprising an eighth executable portion for changing the threshold dynamically in order to compress a data file to the target data file size in response to the indication of the amount of data yet to be processed and the indication of the remaining amount of budget.

14. A computer program product according to claim 12, further comprising an eighth executable portion for changing the weighting values dynamically in order to compress a data file to the target data file size in response to the indication of the amount of data yet to be processed and the remaining amount of budget.

15. An apparatus comprising a processor and memory including computer program code, the memory and the computer program code configured to, with the processor, cause the apparatus to perform at least:
   assigning a weighting value to each coefficient of an array of j number of quantized coefficients, each weighting value defining a characteristic associated with each corresponding coefficient;
   adding a magnitude of a weighted value of an $i^{th}$ coefficient to a magnitude of each weighted value of all previous coefficients, i being a value from 1 to j; and
   comparing an absolute sum of the weighted values of the $i^{th}$ coefficient and the previous coefficients to a threshold,
   replacing each of the previous coefficients with a zero in response to the absolute sum of the weighted values of the $i^{th}$ coefficient and the previous coefficients being greater than the threshold; and
   incrementing i by one and repeating the adding operation in response to the absolute sum of the weighted values of the $i^{th}$ coefficient and the previous coefficients being less than or equal to the threshold.

16. An apparatus according to claim 15, wherein the apparatus is further configured to receive an indication of an amount of data yet to be processed.

17. An apparatus according to claim 16, wherein the apparatus is further configured to receive an indication of a remaining amount of budget in order to achieve a target data file size.

18. An apparatus according to claim 17, wherein the apparatus is further configured to change the threshold dynamically in order to compress a data file to the target data file size in response to the indications of the amount of data yet to be processed and the remaining budget.

19. An apparatus according to claim 17, wherein the apparatus is further configured to change the weighting values dynamically in order to compress a data file to the target data file size in response to the indications of the amount of data yet to be processed and the remaining budget.

20. An apparatus according to claim 15, wherein the apparatus is configured to add coefficients in accordance with a predetermined sequence.

21. An apparatus according to claim 15, wherein the apparatus is configured to add coefficients in accordance with a sequence that is dynamically alterable.

22. An apparatus according to claim 15, wherein the apparatus is further configured to form a resultant linear sequence of coefficients from one of:
   a modified sequence including zeros for the previous coefficients and unchanged values for remaining coefficients in response to the absolute sum of the weighted values of the $i^{th}$ coefficient and the previous coefficients being greater than the threshold; and
   a sequence formed from unchanged values from the array of j number of quantized coefficients if the absolute sum of the weighted values of the $j^{th}$ coefficient and the previous coefficients is less than or equal to the threshold.

23. An apparatus according to claim 22, further comprising a JPEG encoder that encodes the resultant linear sequence of coefficients.

24. A mobile terminal a processor and memory including computer program code, the memory and the computer program code configured to, with the processor, cause the mobile terminal to perform at least:
   assigning a weighting value to each coefficient of an array of j number of quantized coefficients, each weighting value defining a characteristic associated with each corresponding coefficient;
   adding a magnitude of a weighted value of an $i^{th}$ coefficient to a magnitude of each weighted value of all previous coefficients, i being a value from 1 to j; and
   comparing an absolute sum of the weighted values of the $i^{th}$ coefficient and the previous coefficients to a threshold,
   replacing each of the previous coefficients with a zero in response to the absolute sum of the weighted values of the $i^{th}$ coefficient and the previous coefficients being greater than the threshold; and
   incrementing i by one and repeating the adding operation in response to the absolute sum of the weighted values of the $i^{th}$ coefficient and the previous coefficients being less than or equal to the threshold.

25. A mobile terminal according to claim 24, wherein the mobile terminal is further configured to receive an indication of an amount of data yet to be processed.

26. A mobile terminal according to claim 25, wherein the mobile terminal is further configured to receive an indication of a remaining amount of budget in order to achieve a target data file size.

27. A mobile terminal according to claim 26, wherein the mobile terminal is further configured to change the threshold dynamically in order to compress a data file to the target data file size in response to the indications of the amount of data yet to be processed and the remaining budget.

28. A mobile terminal according to claim 26, wherein the mobile terminal is further configured to change the weighting values dynamically in order to compress a data file to the target data file size in response to the indications of the amount of data yet to be processed and the remaining budget.

29. A mobile terminal according to claim 24, wherein the mobile terminal is further configured to add coefficients in accordance with a predetermined sequence.

30. A mobile terminal according to claim 24, wherein the mobile terminal is further configured to add coefficients in accordance with a sequence that is dynamically alterable.

31. A mobile terminal according to claim 24, wherein the mobile terminal is further configured to form a resultant linear sequence of coefficients from one of:
   a modified sequence including zeros for the previous coefficients and unchanged values for remaining coefficients in response to the absolute sum of the weighted values of the $i^{th}$ coefficient and the previous coefficients being greater than the threshold; and
   a sequence formed from unchanged values from the array of j number of quantized coefficients if the absolute sum of the weighted values of the $j^{th}$ coefficient and the previous coefficients is less than or equal to the threshold.

32. A mobile terminal according to claim 31, further comprising a JPEG encoder that encodes the resultant linear sequence of coefficients.

33. A method comprising:
   receiving a data segment comprising a plurality of blocks having respective coefficients associated with each of the blocks;
   utilizing a processor for assigning a weighting value, calculated for each of the blocks during compression of a data file to which the blocks correspond, to each of the coefficients based on frequency information associated with data in each of the blocks; and
   setting one or more of the coefficients to zero based on an aggregation of weighted values,
   wherein different numbers of coefficients are set to zero in one data segment than in another data segment.

34. A method according to claim 33, wherein the setting operation comprises comparing the aggregation of the weighted values to a threshold and setting the one or more coefficients to zero in response to the aggregation reaching the threshold.

* * * * *

UNITED STATES PATENT AND TRADEMARK OFFICE
CERTIFICATE OF CORRECTION

PATENT NO. : 7,639,883 B2 Page 1 of 1
APPLICATION NO. : 11/406449
DATED : December 29, 2009
INVENTOR(S) : Christopher P. Gill It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 925 days.

Signed and Sealed this

Ninth Day of November, 2010

David J. Kappos
*Director of the United States Patent and Trademark Office*